US009838245B2

United States Patent
Sawal et al.

(10) Patent No.: US 9,838,245 B2
(45) Date of Patent: Dec. 5, 2017

(54) SYSTEMS AND METHODS FOR IMPROVED FAULT TOLERANCE IN SOLICITED INFORMATION HANDLING SYSTEMS

(71) Applicant: Dell Products, L.P., Round Rock, TX (US)

(72) Inventors: Vinay Sawal, Fremont, CA (US); Vivek Dharmadhikari, San Jose, CA (US); Sanjay H Sane, Fremont, CA (US)

(73) Assignee: Dell Products, L.P., Round Rock, TX (US)

( * ) Notice: Subject to any disclaimer, the term of this patent is extended or adjusted under 35 U.S.C. 154(b) by 345 days.

(21) Appl. No.: 14/156,168

(22) Filed: Jan. 15, 2014

(65) Prior Publication Data
US 2015/0200802 A1  Jul. 16, 2015

(51) Int. Cl.
*H04L 12/24* (2006.01)
*H04L 29/08* (2006.01)
*H04L 12/707* (2013.01)
*H04L 12/703* (2013.01)

(52) U.S. Cl.
CPC .......... *H04L 41/0668* (2013.01); *H04L 45/22* (2013.01); *H04L 67/1034* (2013.01); *H04L 67/1097* (2013.01); *H04L 41/0836* (2013.01); *H04L 45/28* (2013.01)

(58) Field of Classification Search
CPC .......................... H04L 41/0668; H04L 45/22
See application file for complete search history.

(56) References Cited

U.S. PATENT DOCUMENTS

| | | | |
|---|---|---|---|
| 5,182,744 A * | 1/1993 | Askew ................. | H04Q 3/0079 370/228 |
| 9,094,333 B1 * | 7/2015 | Klemin ................. | H04L 49/356 |
| 2002/0131362 A1 * | 9/2002 | Callon ................ | G06F 11/2294 370/216 |
| 2013/0100809 A1 * | 4/2013 | Gale ..................... | H04L 41/082 370/235 |
| 2013/0250755 A1 * | 9/2013 | Clark ..................... | H04L 69/40 370/228 |
| 2015/0050935 A1 * | 2/2015 | Maniatis ............. | H04W 76/068 455/437 |

\* cited by examiner

*Primary Examiner* — Michael Thier
*Assistant Examiner* — Zhensheng Zhang
(74) *Attorney, Agent, or Firm* — Haynes and Boone, LLP (57) ABSTRACT

An information handling system is provided that uses an overlay network controller to improve fault tolerance and minimize downtime in a solicited system. The network controller may determine standby paths for the solicited communications path and reroute communications to one of the standby paths when a fault is detected in the communications path.

20 Claims, 6 Drawing Sheets

SYSTEMS AND METHODS FOR IMPROVED FAULT TOLERANCE IN SOLICITED INFORMATION HANDLING SYSTEMS

BACKGROUND

Technical Field

Embodiments disclosed herein are related to improved fault tolerance in solicited information handling systems.

Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

However, in certain information handling systems, particularly fully solicited systems requiring a session to be established in order to communicate information, fault tolerance systems may utilize a system heartbeat signal or keep-alive signal that, when not received, indicates that a fault is detected in the system and terminates the established session. Due to the time and inconvenience associated with establishing a new session to communicate information, information loss and downtime may be significant for these solicited information handling systems.

BRIEF DESCRIPTION OF THE FIGURES

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Consistent with some embodiments, there is provided an information handling system. The information handling system includes a first endpoint in communication with a second endpoint through one or more network devices, the first endpoint establishing a session with the second endpoint to communicate information, and a network controller in communication with the first endpoint, the second endpoint, and the one or more network devices. The network controller may be configured to receive session information from the first endpoint, the second endpoint and the one or more network devices, the session information comprising active path information and link status information, determine at least one standby path, send information to the first endpoint and the second endpoint to reroute communicated information from the active path to at least one of the determined standby paths when the link status information indicates that the information communication between the first endpoint and the second endpoint has failed.

Consistent with some embodiments, there is also provided a network controller for an information handling system. The network controller includes one or more processors configured to determine at least one standby path and determine when received link status information indicates a failed communication of information communicated during an established session. The network controller also includes a network interface component configured to receive session information, the session information comprising active path information and link status information, and send reroute information to reroute communicated information from the active path to at least one of the determined standby paths when the received link status information indicates a failed communication. The network interface component is also configured to receive the link status information indicating a failed communication and send the reroute information before the session for communicating the communicated information is terminated. The network controller may also include a memory configured to store the active path information and the determined at least one standby paths.

Consistent with some embodiments, there is further provided a method for rerouting information in an information handling system. The method includes steps of receiving link status information indicating a status of communication of information between two endpoints during an established session, determining at least one standby path for the communication of the information between the two endpoints, determining when the link status information indicates that the communication of the information between the two endpoints during the session has failed, and sending reroute information to reroute the communication of the information to one of the determined standby paths when it is determined that the communication of the information has failed. The method may be embodied in computer-readable media.

These and other embodiments will be described in further detail below with respect to the following figures.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
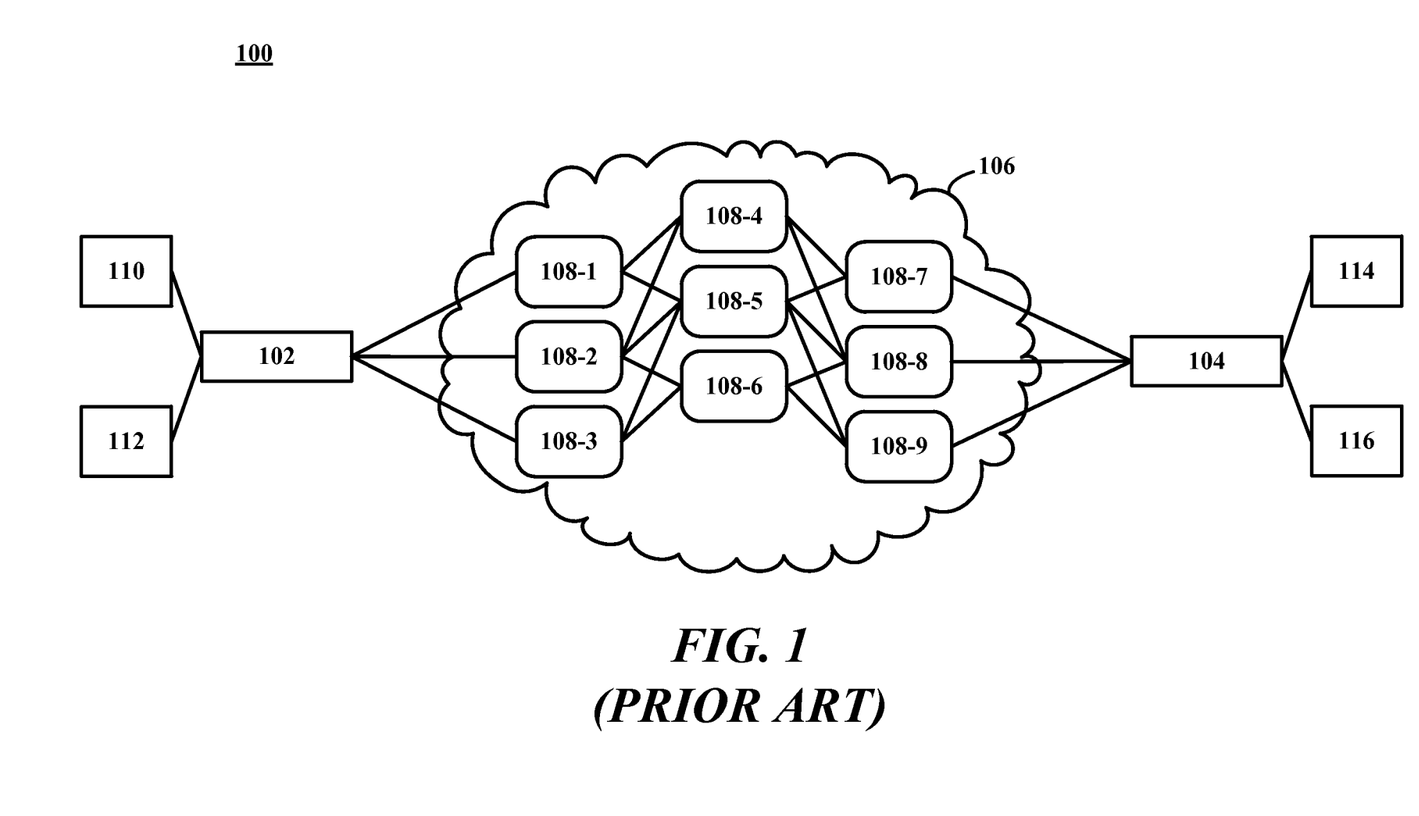
FIG. 1 is a diagram illustrating a conventional information handling system requiring a solicited session between a first endpoint and a second endpoint.

FIG. 1 is a diagram illustrating a conventional information handling system 100 requiring a solicited session between the first endpoint 102 and the second endpoint 104. As shown in FIG. 1, system 100 includes first endpoint 102 in communication with second endpoint 104 through cloud 106, wherein a session must be established between first endpoint 102 and second endpoint 104 in order for first endpoint 102 and second endpoint 104 to communicate information. Cloud 106 includes a plurality of network devices 108-1-108-9 (referred to collectively as "network devices 108") configured to receive and forward information between endpoints 102 and 104.

As shown in FIG. 1, first endpoint 102 may be coupled to a first initiator 110 and a second initiator 112, and second endpoint 104 may be coupled to a first target 114 and a second target 116. At least one of first initiator 110 and second initiator 112 may initiate or solicit a session to communicate information to at least one of first target 114 and second target 116. The session may be established between first endpoint 102 and second endpoint 104 and the information may be communicated between first endpoint 102 and second endpoint 104 through cloud 106. When information is communicated from first endpoint 102 to second endpoint 104 through cloud 106, the information may be communicated over a path made up by one or more network devices 108. For example, one path may be 108-1, 108-5, 108-8, another path may be 108-3, 108-6, 108-9, and so forth.

However, when one of network devices 108 suffers an outage, fails, or otherwise experiences downtime, loss of information may occur for any information being routed through a path that includes the failed network device. A conventional solicited information handling system, such as shown in FIG. 1, typically relies on a keep-alive signal or heartbeat signal that is periodically transmitted from network devices 108 to endpoints 102 and 104 to monitor the link status of network devices 108. First endpoint 102 and second endpoint 104 expect to receive this keep-alive or heartbeat signal within a predetermined expiration time to know that there are currently no faults or link failures within cloud 106. However, in a solicited network such as shown in FIG. 1, when first endpoint 102 or second endpoint 104 fail to receive the keep-alive message or heartbeat signal after the expiration time has passed, the established session will be terminated, and a new session will be solicited over a valid and functioning path through cloud 106. The expiration time associated with the keep-alive or heartbeat signal may be between about 20-255 seconds, and the time to establish a new session may be between about 20-30 seconds. Consequently, when a link or node failure occurs in cloud 106, there will be a period of between about 40-285 seconds in which information will be lost in cloud 106. Moreover, as the number of network devices 108 that the information must travel through in cloud 106 increases, the probability of a failure increases linearly.

Figure 2:
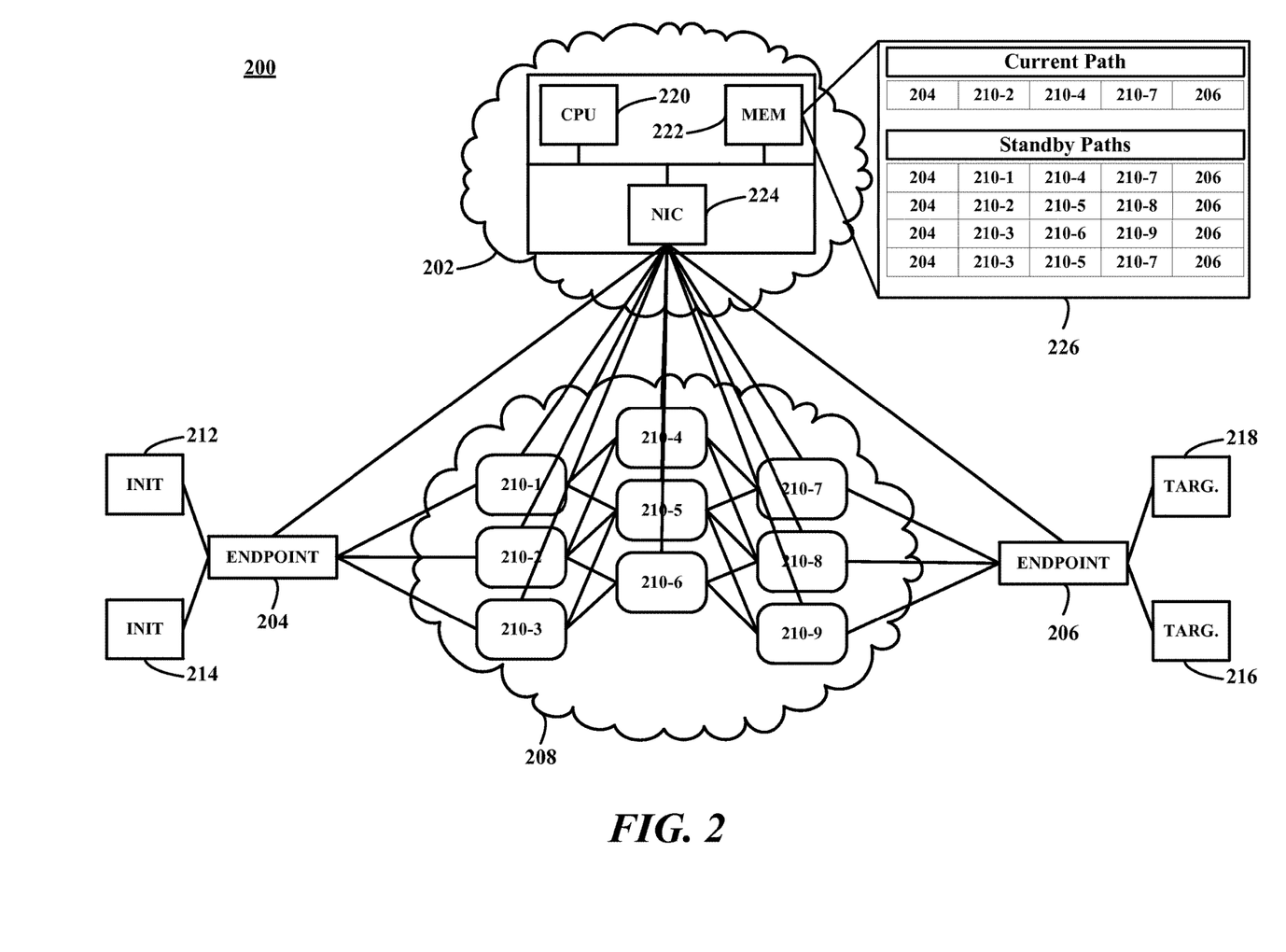
FIG. 2 is a diagram of an information handling system having a network controller for monitoring the flow of information between a first endpoint and a second endpoint in a solicited session, consistent with some embodiments.

FIG. 2 is a diagram of an information handling system 200 having a network controller 202 for monitoring the flow of information between a first endpoint 204 and a second endpoint 206 in a solicited session, consistent with some embodiments. As shown in FIG. 2, system 200 includes first endpoint 204 in communication with second endpoint 206 through cloud 208, wherein a session must be established between first endpoint 204 and second endpoint 206 in order for first endpoint 204 and second endpoint 206 to communicate information. Cloud 208 includes a plurality of network devices 210-1-210-9 (referred to collectively as "network devices 210") configured to receive and forward information between endpoints 204 and 206. Although cloud 208 is illustrated as including nine (9) network devices 210, cloud 208 may include N network devices, where N is a positive integer.

As shown in FIG. 2, first endpoint 204 may be coupled to a first initiator 212 and a second initiator 214, and second endpoint 206 may be coupled to a first target 216 and a second target 218. At least one of first initiator 212 and second initiator 214 may initiate or solicit a session to communicate information to at least one of first target 216 and second target 218. The session may be established between first endpoint 204 and second endpoint 206 and the information may be communicated between first endpoint 204 and second endpoint 206 through cloud 208. In some embodiments, system 200 may correspond to any fully solicited information handling system or any system requiring an established session between first endpoint 204 and second endpoint 206 to communicate information. In some embodiments, system 200 may correspond to a Fibre Channel (FC) system, a Fibre Channel over Ethernet (FCoE) system, or a remote direct memory access (RDMA) over Converged Ethernet (RoCE) system. Accordingly, the information communicated between first endpoint 204 and second endpoint 206 may be FC information, FCoE information, or RoCE information.

Network controller 202 may be a computer, server, or a collection of computers or servers coupled to and in communication with first endpoint 204, second endpoint 206, and network devices 210. In some embodiments, network controller 202 may be an overlay network controller in that it is overlaid on top of an existing network or system. Network controller 202 may include a central processing unit (CPU) 220 that may be one or more processors, micro-controllers, graphics processing units (GPUs) digital signal processors (DSPs) and the like configured to execute instructions stored in a memory 222 coupled to CPU 220. Memory 222 may correspond to a random access memory (RAM), an internal memory component, a read-only memory (ROM), or an external or static optical, magnetic, or solid-state memory. Network controller 202 may also include a network interface component (NIC) 224 configured to send information to and receive information from first endpoint 204, second endpoint 206, and network devices 210. NIC 224 may be any networking device capable of communicating information with first endpoint 204, second endpoint 206, and network devices 210.

In some embodiments, one or more agents (not shown) may be installed in networking devices 210 and endpoints 204 and 206 for collecting and providing information to network controller 202. The information collected by the agents and provided to network controller 202 may include session information that includes a current path information and link status information. In some embodiments, the current path information may be information regarding the current path through cloud 208 over which information is communicated between first endpoint 204 and second endpoint 206. In some embodiments, the link status information may include state information such as synchronization information, keep-alive signal information, fabric or communicated information type information, and link failure information. The link failure information may include information such as state information indicating a current state of a network device 210, the state information being up, down, up or down and waiting for information, and error. Additional information that may be provided by agents and otherwise received by network controller 202 may include an identifier of the device, which may correspond to a media access control (MAC) address or network address and the like, a type of the device identifying the device as a network device such as network devices 210, or an endpoint. Additional information may be provided to network controller 202 including a session identifier, latency data, and the like. In some embodiments, link status information may be provided to network controller 202 on a periodic basis, wherein the period is less than an expiration time associated with a system-wide keep-alive or heartbeat signal. In some embodiments, the link status information may be provided to network controller 202 every few milliseconds.

In some embodiments, when a session is established between first endpoint 204 and second endpoint 206 to communicate information, a path through cloud 208 is determined, which is the current path. This current path information may then be provided to network controller 202 which may store this information in memory 222. Moreover, when the session is established, CPU 220 may determine one or more standby or alternate paths between first endpoint 204 and second endpoint 206. In some embodiments, current path information and the determined standby paths may be stored in a table 226 in memory 222 of network component 202.

Figure 3:
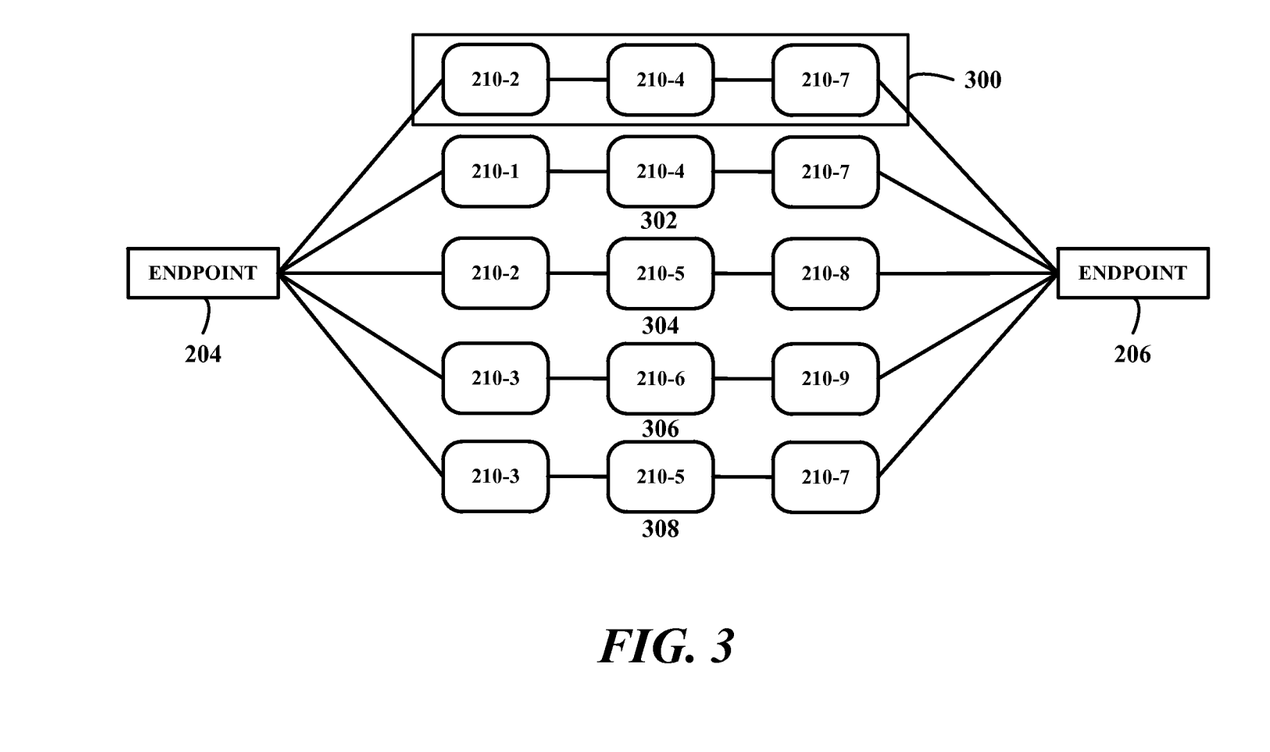
FIG. 3 is an illustration of current and standby paths between the first endpoint and the second endpoint, consistent with some embodiments.

FIG. 3 is an illustration of current and standby paths between first endpoint 204 and second endpoint 206, consistent with some embodiments. As shown in FIG. 3, a current path 300 between first endpoint 204 and second endpoint 206 may go through network device 210-2, network device 210-4, and network device 210-7, from first endpoint 204 to second endpoint 206, and through network device 210-7, network device 210-4, and network device 210-2, from second endpoint 206 to first endpoint 204. The standby paths 302-308 determined by CPU 220 may include various other configurations of network devices 210 through which information can be communicated between first endpoint 204 and second endpoint 206. Although each standby path 302-308 shown in FIG. 3 includes traveling through three network devices 210 (three "hops"), more or less network devices 210 may make up a standby path. In some embodiments, standby paths 302-308 are determined based on information provided to network controller 202 about the network devices 210, such as a latency associated with network device 210, whether the network device 210 is waiting for information or is busy, and whether the link status of network device 210 indicates that network device 210 is active or has failed. Standby paths 302-308 may be determined by CPU 220 of network controller 202 as alternate paths through which information may be communicated between first endpoint 204 and second endpoint 206 when a link failure or other error occurs in current path 300.

Figure 4:
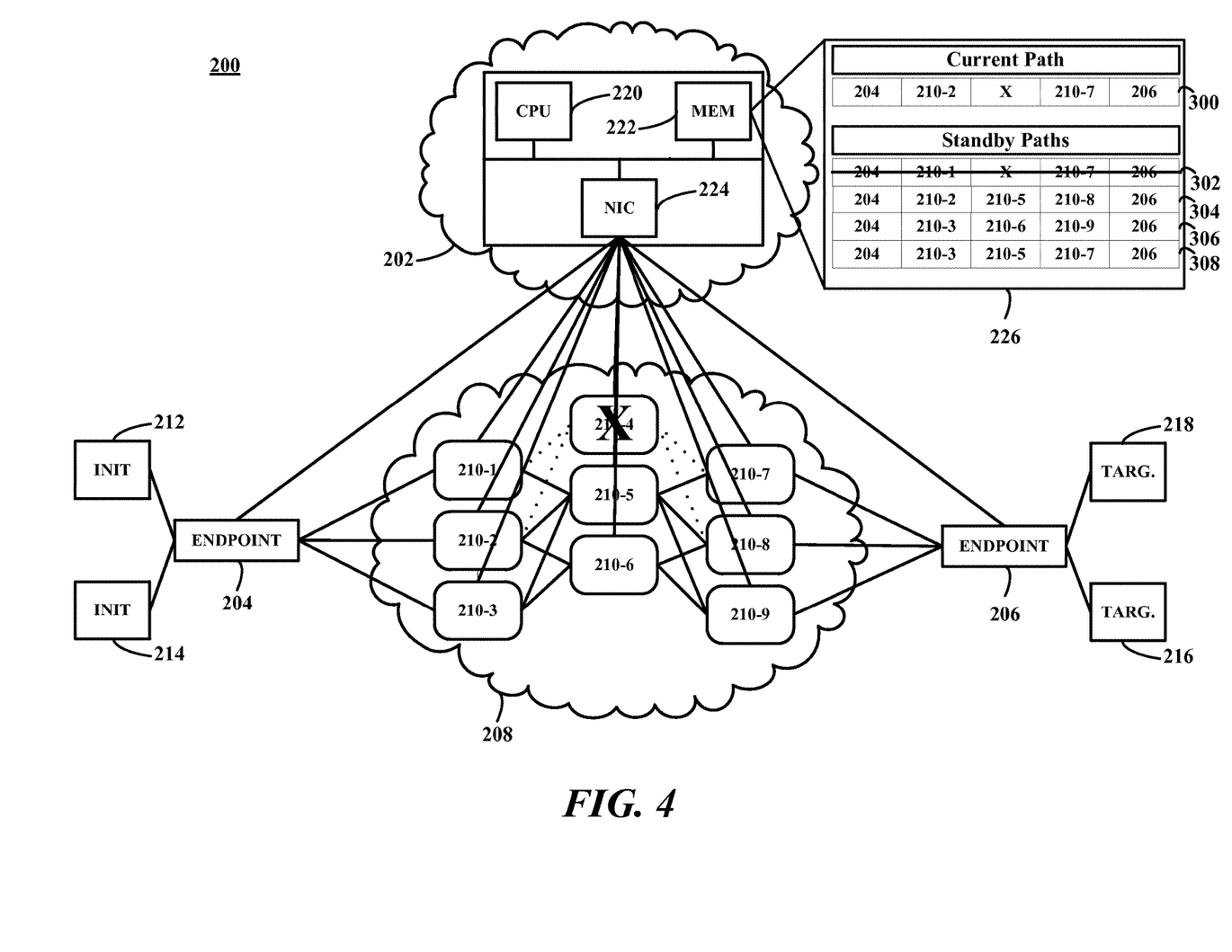
FIG. 4 is a diagram illustrating the information handling system having a link failure in a current path, consistent with some embodiments.

FIG. 4 is a diagram illustrating information handling system 200 having a link failure in current path 300, consistent with some embodiments. As shown in FIG. 4, when network device 210-4 is offline, experiencing errors, or otherwise down, information to and from network device 210-4 may not be communicated. In some embodiments, agents installed in network devices 210 may determine that information is not be sent to or received from network device 210-4 and provide this information to network controller 202. For example, agents installed in network device 210-1 and network device 210-7 may provide this information to network controller 202 when information between first endpoint 204 and second endpoint 206 is no longer able to be communicated through network device 210-4. In some embodiments, agents installed in network device 210-4 may provide information to network controller 210 indicating that network device 210-4 has failed, is offline or down, or that information is unable to be sent or received by network device 210-4. In some embodiments, network controller 202 may expect to receive a heartbeat or other signal from agents installed in network devices 210 indicating that network devices 210 are up and running and may determine a link status of network device 210-4 to be a link failure when a heartbeat signal or other signal has not been received after an time period that may be smaller than a time period associated with a system-wide keep-alive or heartbeat expiration time.

When network controller 202 receives link status information that indicates that there is an error in current path 300 such that information is no longer being communicated between first endpoint 204 and second endpoint 206, network controller 202 may then update table 226 to indicate that current path 300 has failed. Network controller 202 may also update table to remove any standby path that relies on the failed network device. Network controller 202 may then select one of the standby paths to be a current path, and provide the path information to first endpoint 204, second endpoint 206, and network devices 210 such that information communicated between first endpoint 204 and second endpoint 206 through network devices 210 is rerouted according to the provided path information. For example, network controller 202 may select standby path 304 as a new current path, and provide this path information to first endpoint 204, second endpoint 206, and network devices 210. Information communicated between first endpoint 204 and second endpoint 206 may then be communicated over path 304. Table 226 may then be updated to indicate that path 304 is the current path, and additional standby paths may be determined. In some embodiments, when network device 210-4 comes back online or otherwise is able to communicate information, paths including network device 210-4, such as current path 300, may be determined as being a standby path.

Since a session between first endpoint 204 and second endpoint 206 may be terminated after a system-wide keep-alive or heartbeat expiration time when no keep-alive or heartbeat signal is received from a failed network device, such as network device 210-4, first endpoint 204 and second endpoint 206 would then have to reestablish a session to communicate information, which will take valuable time in which there is no information being communicated. However, consistent with the embodiments shown in FIGS. 2-4, network agents installed in network devices 210 may provide link status information that may indicate when a network device 210 has failed to network controller 202, and network controller 202 may then select a standby path through which information may be communicated, and provide that path information to first endpoint 204, second endpoint 206, and network devices 210 in cloud 208. Moreover, the time taken to receive the fault information and reroute the information communication over a standby path may be less than a system-wide keep-alive or heartbeat expiration time such that the session between first endpoint 204 and second endpoint 206 is not terminated. As a result, the embodiments shown in FIGS. 2-4 may provide fault tolerance for solicited systems requiring a solicited session to communicate information, such as information handling system 200, that improve upon the system-wide keep-alive or heartbeat expiration timer since a new session does not need to be established for faults detected in cloud 208.

Figure 5:
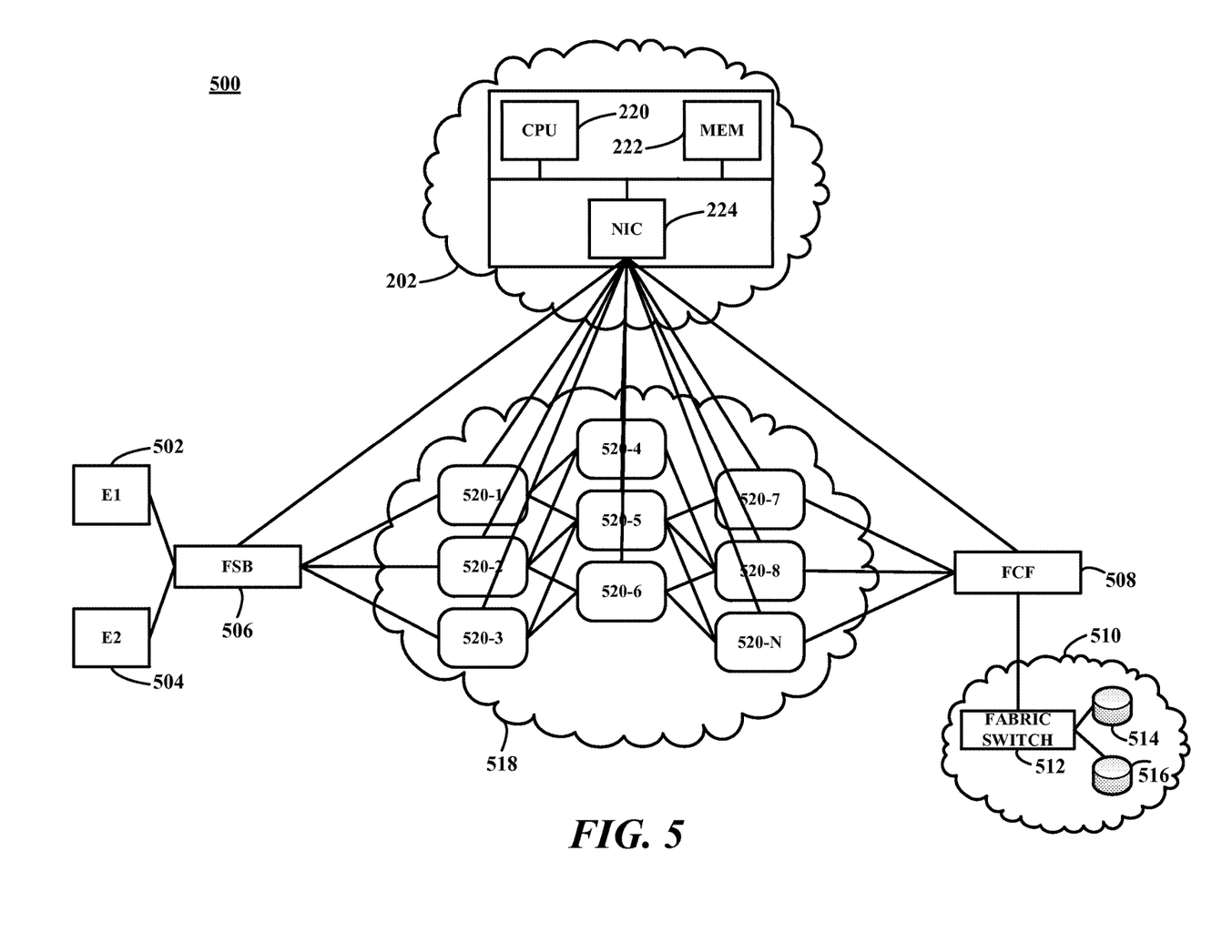
FIG. 5 is a diagram illustrating a Fibre Channel over Ethernet (FCoE) information handling system having the network controller, consistent with some embodiments.

FIG. 5 is a diagram illustrating a FCoE information handling system having network controller 202, consistent with some embodiments. As shown in FIG. 5, a specific type of solicited information handling system requiring a session to be established to communicate information is a FCoE information handling system 500. System 500 may include a first and second initiators 502 and 504, or Enodes, in communication with a first endpoint 506, which may be an FCoE initialization protocol (FIP) snooping bridge (FSB). Second endpoint 508, which may be a fibre channel forwarder (FCF), is in communication with a target storage area network (SAN) 510 that includes a fabric switch 512 and databases 514 and 516. FSB 506 may be in communication with FCF 508 through cloud 518 that is made up of network devices 520-1-520-N (referred to collectively as network devices 520). In some embodiments network devices 520 may be a Layer 2 (L2) switch. Network controller 202 may be in communication with FSB 506, FCF 508, and network devices 520. Moreover, similar to the embodiments shown in FIGS. 2-4, network agents may be installed in FSB 506, FCF 508, and network devices 520 for providing session information and link status information to network controller 202.

In a native fibre channel network, FC devices such as Enodes 502 and 504 and SAN 510 may be in direct communication with fibre channel switching elements to form a fibre channel fabric. FCoE, however, allows for the encapsulation of fibre channel communications in Ethernet frames to provide a lossless Ethernet medium. This may be accomplished, in part, by FCoE devices such as FSB 506 and FCF 508. Although the FCoE devices may appear invisible to fibre channel devices such as Enodes 502 and 504 and SAN 510, they may act as an aggregator of flows from multiple fibre channel device into a single port of FSB 506 and/or FCF 508.

In operation, Enodes 502 and 504 may provide FSB 506 with fibre channel information to communicate to SAN 510 for storage. FSB 506 may include a converged network adaptor (CNA) (not shown) that receives the fibre channel information and converts it to FCoE information. In some embodiments, the CNA of FSB 506 may encapsulate the fibre channel information within a FCoE frame that includes typical Ethernet information. FSB 506 may then initiate a session with FCF 508 to solicit communication with FCF.508 The session may be initiated according to the FCoE initialization protocol (FIP). In some embodiments, it may take between about 20 and about 30 seconds to initiate and establish the FCoE session between FSB 506 and FCF 508. Once the session has been established, FSB 506 may then communicate the FCoE information to FCF 508 through cloud 518. FCF 508 may receive the FCoE information and decapsulate the FCoE wrapper such that the fibre channel information may be provided to SAN 510. The fibre channel information may be received at SAN 510 by fabric switch 512, which may route the received fibre channel information to database 514 or database 516, or additional an additional database (not shown) in SAN 510.

FCoE information handling systems such as system 500 may use a system-wide keep-alive timer referred to as a FIP keep-alive timer that is used to determine when a fault is present. When the expiration time for the FIP keep-alive timer is reached for information to be communicated, FSB 506 may terminate the session with FCF 508 and establish a new session with FCF 508. The expiration time associated with the FIP keep-alive timer may be between about 20-255 seconds, and the time to establish a new session may be between about 20-30 seconds. Consequently, an FCoE information handling system such as system 500 may have between 40 and 285 seconds of no information communication when a fault occurs in cloud 518.

However, network controller 202 may be used with FCoE information handling system 500 to provide improved fault tolerance. In some embodiments, when a session is established between FSB 506 and FCF 508 to communicate information, a path through cloud 518 is determined, which is the current path. This current path information may then be provided to network controller 202 which may store this information in memory 222. Moreover, when the session is established, CPU 220 may determine one or more standby or alternate paths between FSB 506 and FCF 508. When a fault occurs in cloud 518, such as may be caused by one of network devices 520 going offline, experiencing errors, or otherwise down, agents installed in network devices 520 may determine that information is not be sent to or received from the failed network device 520 and provide this information to network controller 202. In some embodiments, network controller 202 may expect to receive a heartbeat signal from agents installed in network devices 520 and may determine a link status of a network device 520 to be a link failure when a heartbeat signal has not been received after an time period that may be smaller than a time period associated with the FIP keep-alive timer.

When network controller 202 receives link status information that indicates that there is an error in the current path such that information is no longer being communicated between FSB 506 and FCF 508, network controller 202 may then select one of the standby paths to be a current path, and provide the path information to FSB 506, FCF 508, and network devices 520 such that information communicated between FSB 506 and FCF 508 through network devices 520 is rerouted according to the provided path information. In some embodiments, network controller 202 may be able to receive link status information indicating an error in the current path, select a standby path, and provide the path information to FCoE information handling system 500 to reroute the communications over the new path in a time that is less than an expiration time associated with the FIP keep-alive timer. Consequently, FCoE information handling system 500 having network controller 202 may be able to have increased fault tolerance by detecting and repairing faults in a session between FSB 506 and FCF 508 before a session is terminated, resulting in less information being lost and less downtime when a fault occurs.

Figure 6:
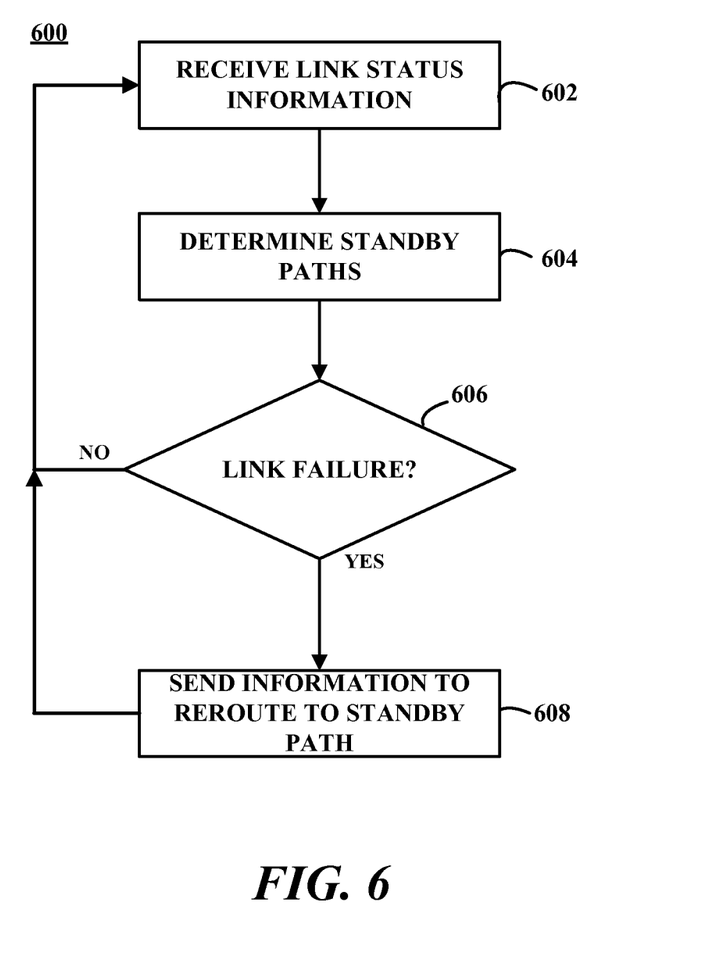
FIG. 6 is a flowchart illustrating a process for rerouting information in an information handling system, consistent with some embodiments.

FIG. 6 is a flowchart illustrating a process 600 for rerouting information in an information handling system, consistent with some embodiments. For the purpose illustration, process 600 may be described with reference to any of FIGS. 2-4. Process 600 may also be implemented in a FCoE information handling system 500 such as shown in FIG. 5. Process 600 may be embodied in non-transient, tangible, computer-readable media, such as memory 222 of network controller 202, and may be executed by CPU 220 for the purpose of performing process 600. As shown in FIG. 6, process 600 includes receiving link status information from one or more agents installed in an information handling system 200 (602). In some embodiments, the agents may be installed in a first endpoint 204, a second endpoint 206, and network devices 210 in cloud 208 through which information is communicated between first endpoint 204 and second endpoint 206. Moreover, the link status information may include information indicating a status of communication of information between first endpoint 204 and second endpoint 206. Additional information may also be included in the link status information, such as session information and current path information.

When a session is established between first endpoint 204 and second endpoint 206 through current path 300 in cloud 208, CPU 220 of network controller 202 may determine one or more standby paths through cloud 208 (604), such as standby paths 302-308. Network controller 202 may continue to receive link status information (602) from the agents installed in information handling system 200 and determine standby paths (604) based on the received link status until a link failure is detected. When a link failure is detected (606), network controller 202 may then select a standby path and send the standby path information to first endpoint 204, second endpoint 206, and network device 210 in cloud 208 to reroute the communication of information through cloud 208 over the standby path (608). Network controller 202 may continue to execute process 600 during an established session to ensure that downtime and information loss is minimized and that the session does not expire. Moreover, the time taken to receive link status information indicating a link failure (606) and send information to reroute the information communication over a standby path (608) may be less than a system-wide keep-alive or heartbeat expiration time such that the session between first endpoint 204 and second endpoint 206 is not terminated. As a result, process 600 may provide fault tolerance for solicited systems requiring a solicited session to communicate information, such as information handling system 200, that improve upon the system-wide keep-alive or heartbeat expiration timer since a new session does not need to be established for faults detected in cloud 208.

Consequently, embodiments as described herein may provide improved fault tolerance in a solicited information handling system. In particular, embodiments as described herein may use an overlay network controller to determine when a fault occurs in the communication of information between endpoints of the information handling system, and reroute information according to a standby path to minimize downtime and information loss. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system, comprising:
a first endpoint coupled to a second endpoint through one or more network devices of a network, the first endpoint comprising a fibre channel over Ethernet (FCoE) initialization protocol (FIP) snooping bridge for establishing a session with the second endpoint by encapsulating a FCoE frame with fibre channel information, the session including an expiration time; and
a network controller in communication with the first endpoint, the second endpoint, and the one or more network devices, the network controller configured to:
receive status information from the first endpoint, the second endpoint, and the one or more network devices, the status information comprising information regarding the one or more network devices and network links along a first path from the first endpoint through the one or more network devices to the second endpoint;
determine one or more standby paths between the first endpoint and second endpoint through the one or more network devices based on the status information;
determine whether there is a link failure in the first path preventing communication between the first endpoint and the second endpoint using the first path for the session based on the status information;
when the expiration time has been reached, forward instructions to the first endpoint to establish a new session with the second endpoint by encapsulating a second FCoE frame with fibre channel information, the new session including a second expiration time; and
in response to the link failure, when the expiration time has not been reached, select one of the one or more standby paths to be a current path, and provide instructions to the first endpoint to reroute communication between the first and second endpoints using the selected standby path.

2. The information handling system of claim 1, further comprising:
an initiator coupled to the first endpoint; and
a target coupled to the second endpoint.

3. The information handling system of claim 2, wherein the target comprises a storage area network (SAN).

4. The information handling system of claim 1, wherein the second endpoint comprises a fibre channel forwarder.

5. The information handling system of claim 4, wherein the session is used to communicate FCoE information.

6. The information handling system of claim 1, wherein the session is used to communicate remote direct memory access (RDMA) over Converged Ethernet (RoCE) information.

7. The information handling system of claim 1, wherein a time to reroute communication from the first path to the selected standby path is less than the expiration time, the expiration time being a keep-alive signal expiration time associated with the information handling system.

8. The information handling system of claim 1, wherein each of the one or more network devices comprises a respective agent, each respective agent being configured to collect the status information and send the collected status information to the network controller.

9. The information handling system of claim 1, wherein the network controller comprises a memory storing additional information describing the first path and the one or more standby paths.

10. The information handling system of claim 9, wherein the network controller is further configured to update a table stored in the memory to remove any standby path of the one or more standby paths that relies upon one or more links associated with the link failure.

11. The information handling system of claim 1, wherein the status information includes one or more selected from the group consisting of synchronization information, keep-alive signal information, fabric or communicated information type information, link failure information, and latency between one or more of the one or more network devices.

12. A network controller for an information handling system, the network controller comprising:
 a memory;
 a network interface component coupling the network controller to a network comprising a first endpoint, a second endpoint and one or more network devices, the first endpoint comprising a fibre channel over Ethernet (FCoE) initialization protocol (FIP) snooping bridge; and
 one or more processors coupled to the memory and the network interface component, the one or more processors being configured to:
  receive status information from the first endpoint, the second endpoint, and the one or more network devices, the status information comprising status information associated with the one or more network devices and network links along a first path from the first endpoint through the one or more network devices to the second endpoint established between the first endpoint and the second endpoint through the network upon establishment of a session between the first endpoint and the second endpoint, the session being established by the FIP snooping bridge by encapsulating a FCoE frame with fibre channel information, the session including an expiration time;
  determine one or more standby paths between the first endpoint and the second endpoint based on the status information;
  detect a link failure in the first path preventing communication between the first endpoint and the second endpoint using the first path for the session based on the received status information;
  when the expiration time has been reached, forward instructions to the first endpoint to establish a new session with the second endpoint by encapsulating a second FCoE frame with fibre channel information, the new session including a second expiration time; and
  in response to the link failure, when the expiration time has not been reached, select one of the one or more standby paths to be a current path and provide instructions to the first endpoint to reroute communication between the first and second endpoints using the selected standby path.

13. The network controller of claim 12, wherein the session is used to communicate fibre channel over Ethernet (FCoE) information.

14. The network controller of claim 12, wherein the session is used to communicate remote direct memory access (RDMA) over Converged Ethernet (RoCE) information.

15. The network controller of claim 12, wherein the status information is collected by and received from a respective agent installed in each of the one or more network devices.

16. A method for rerouting information in an information handling system, comprising:
 receiving, at a network controller, status information from a first endpoint, a second endpoint, and one or more network devices in a network, the status information comprising status of the one or more network devices and network links along a first path from the first endpoint through the one or more network devices to the second endpoint during a session, the session being established by the first endpoint by encapsulating a FCoE frame with fibre channel information, the session including an expiration time;
 determining, by one or more processors of the network controller, one or more standby paths between the first endpoint and the second endpoint;
 detecting, by the one or more processors, a link failure in the first path preventing communication between the first endpoint and the second endpoint using the first path based on the received status information;
 when the expiration time has been reached, forward instructions to the first endpoint to establish a new session with the second endpoint by encapsulating a second FCoE frame with fibre channel information, the new session including a second expiration time; and
 in response to the link failure, when the expiration time has not been reached, selecting one of the one or more standby paths to be a current path and providing instructions to the first endpoint to reroute communication between the first and second endpoints using the selected standby path.

17. The method of claim 16, wherein the status information is received from a respective agent installed in each of the one or more network devices.

18. The method of claim 16, wherein the session is used to communicate fibre channel over Ethernet (FCoE) information.

19. The method of claim 18, wherein the first endpoint comprises a FCoE initialization protocol (FIP) snooping bridge and the second endpoint comprises a fibre channel forwarder.

20. The method of claim 19, wherein the FIP snooping bridge is coupled to an initiator and the fibre channel forwarder is coupled to a target.

* * * * *